Nov. 14, 1961 D. H. KAPLAN 3,008,524
CONTROL SYSTEM FOR FOUR POWER UNITS AND THE COMBINATION
Filed Sept. 16, 1958 2 Sheets-Sheet 1
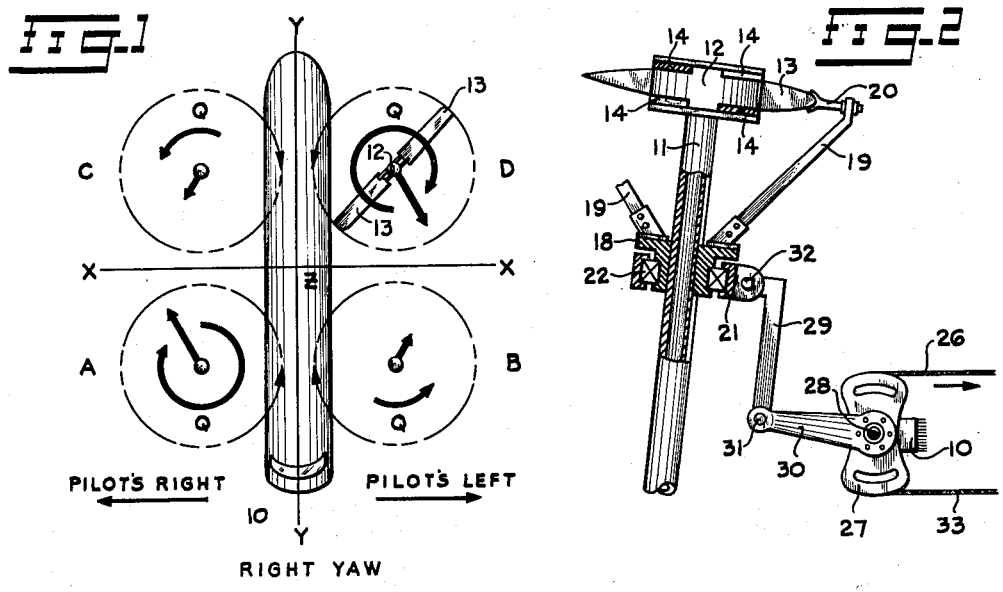
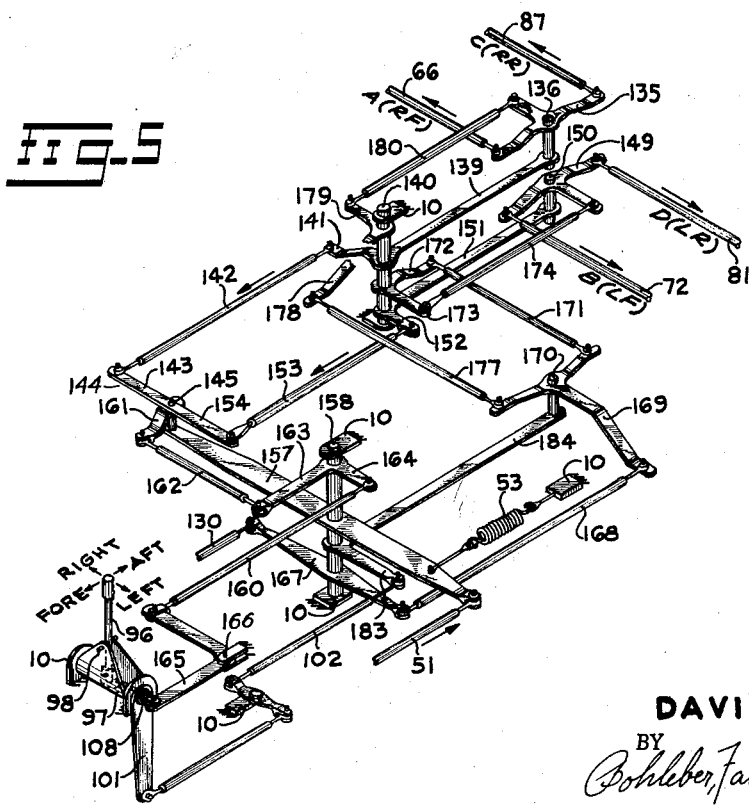
INVENTOR.
DAVID H. KAPLAN
ATTORNEYS

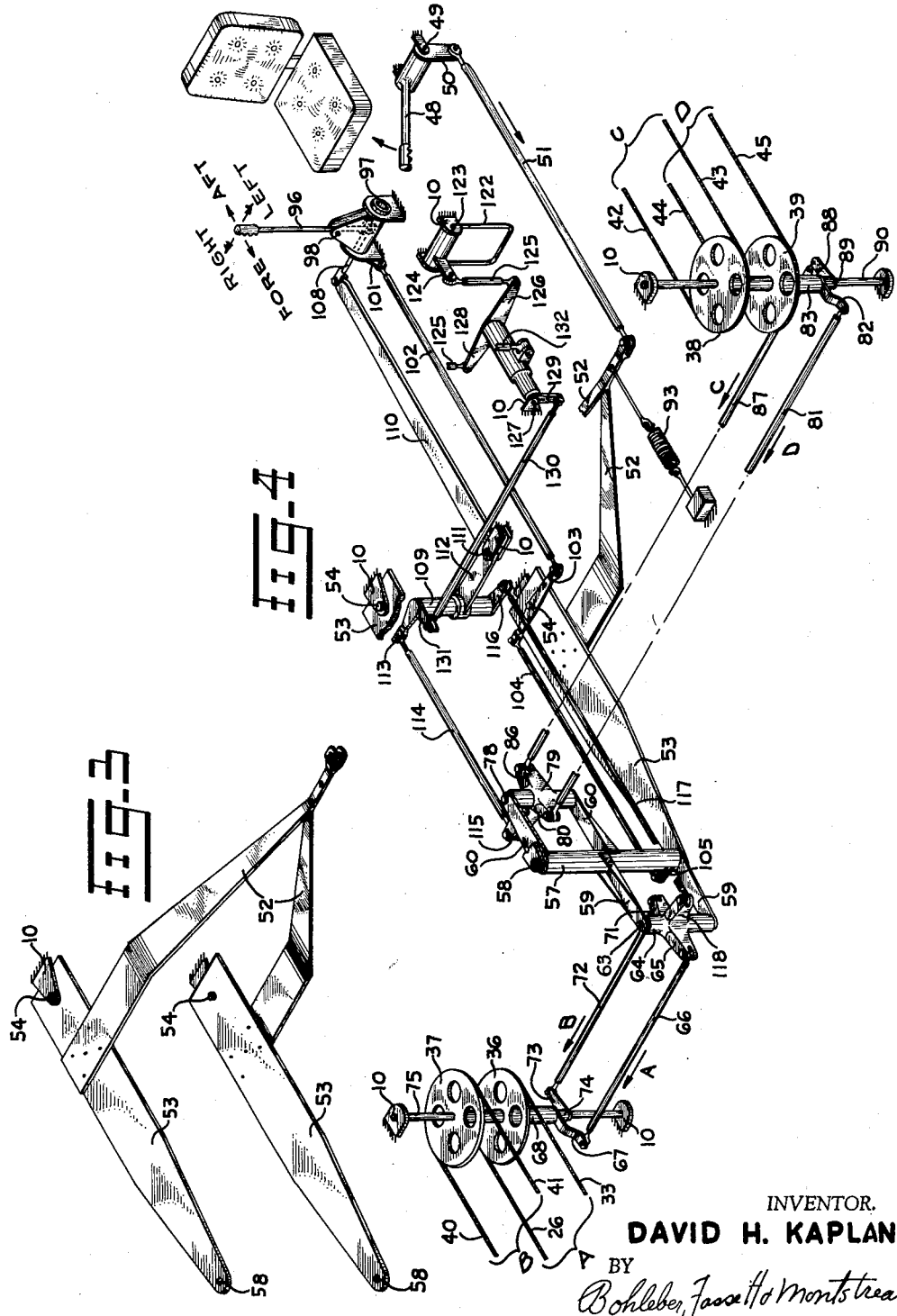

United States Patent Office 3,008,524
Patented Nov. 14, 1961

3,008,524
CONTROL SYSTEM FOR FOUR POWER UNITS
AND THE COMBINATION
David H. Kaplan, Huntington, N.Y., assignor to Convertawings, Inc., Amityville, N.Y., a corporation of New York
Filed Sept. 16, 1958, Ser. No. 761,422
22 Claims. (Cl. 170—135.24)

This invention relates to a control system applicable to machines or devices having four power units. In particular, it applies to helicopters or rotary wing aircraft having four or more lifting rotors which utilize blade pitch variation for lift, propulsion and control. However, the control system is applicable to the control of a machine having plural thrust producing devices such as may be used on submarines, space vehicles and the like.

An object of the invention is to provide a four rotor aircraft having a system for control of the craft by means of collective blade pitch alone and without cyclic feathering of blade pitch.

A further object is to construct a control system for a four rotor aircraft which uses collective pitch solely.

Another object is to provide a control system to actuate four or more rotors that is simple in construction.

Another object is to provide an arrangement of four rotors which will improve control effectiveness.

Another object of the invention is to eliminate the undesirable interaction of forces and torques heretofore associated with helicopter control.

Another object is to construct a control system in combination with the arrangement of four or more propulsive units which will function in the atmosphere, in space, or under water.

Other objects of the invention will appear from the accompanying description and drawings illustrating a preferred embodiment thereof in which:

FIG. 1 is a plan view of a four rotor helicopter showing the horizontal component of lift forces, and torque forces under a particular condition;

FIG. 2 shows a portion of the blade pitch change mechanism at each rotor head to secure blade pitch change;

FIG. 3 is a view of the main lever means of FIG. 4;

FIG. 4 is an isometric view of the control system with parts broken away, and generally diagrammatically illustrated for actuating and mixing the movements of the pilot's controls to each of the four rotors of FIG. 1; and FIG. 5 shows another form of control system which produces the same result.

The arrangement of the rotors of a four rotor machine is shown in FIG. 1 in which two rotors are forward and abreast of one another and two rotors are to the rear and abreast of one another. This arrangement is commonly called the "square" or "rectangular" configuration as distinguished from a "diamond" configuration. FIG. 1 also shows the preferred direction of rotation of each rotor by the curved arrows in which rotation is the same for diagonally displaced pairs of rotors A and D and B and C and opposite for adjacent rotors A and C and A and B. The heavy shaded straight arrows represent the horizontal component of the force on or thrust of the rotors and the curved arrows are torque forces.

Each rotor and its shaft is preferably inclined through fixed angles in two planes and the angle may be initially selected or designated but should be a consistent or uniform pattern. Both forward and rearward pairs of sets of rotors are preferably inclined laterally or as viewed from the front so that the projection of their rotor axes of rotation or shafts for each set or pair intersect below the rotors. The axes of the rotors and hence their shafts are preferably inclined in a fore and aft direction or plane such that when viewed from the side their axes of rotation or shafts intersect above the rotors. By inclining the rotors, the resultant thrust vectors have components is the horizontal and vertical directions. The vertical components provide lift and the horizontal components, illustrated for one condition in FIG. 1 are shown as straight arrows. With blade pitch the same on all four rotors, the horizontal vectors or components are equal and the aircraft rises, hovers or descends depending upon the pitch of the blades.

By a differential variation in the vertical force component, secured by differential control of the blade pitch of the fore and aft pairs of rotors, aircraft control in pitch is obtained about a lateral axis X—X and aircraft control in roll is obtained about the longitudinal axis Y—Y by differential control of the longitudinal pairs of rotors. Control in roll to the pilot's right is obtained by increasing the blade pitch of rotors B and D and decreasing the blade pitch of rotors A and C. A nose down moment and forward flight will be produced by increasing the blade pitch of rotors C and D and decreasing the blade pitch of rotors A and B. Blade pitch changes for aircraft pitch or roll maneuvers produce no undesirable rotor torque because any two rotors having the same thrust will be turning in opposite directions, thereby cancelling the rotor torques.

By differential control of the blade pitch of diagonally positioned rotors, control in yaw is secured. The horizontal components of the resultant forces are used to yaw the craft about its vertical axis Z—Z. In addition to the horizontal components of the forces, unequal rotor torques are secured to augment the yaw control. The diagram for a typical yaw maneuver is shown in FIG. 1 where the craft is yawed to the pilot's right. To do this, the pitch of the blades of rotors A and D is increased while the pitch of the blades of rotors B and C is reduced. The horizontal component of the rotor force for each rotor is correspondingly changed and are illustrated by the straight arrows for rotors A and D being longer and arrows for rotors B and C being shorter resulting in a force couple about the Z or vertical axis. Simultaneously, the torques of rotors A and D will increase as shown by longer circular arrows and those of B and C will decrease as shown by shorter circular arrows. These torques do not cancel and there is a net torque applied in the direction of the turn to the pilot's right. In addition to this torque, there is a net moment or couple about axis Z due to the horizontal components of the rotor forces in the direction of a turn to the pilot's right. Rotor torque alone for control has been found to be insufficient and a material increase in efficiency and effectiveness is secured by utilizing both torque and a component of the rotor resultant force.

The collective pitch change of the rotor blades is effected by any suitable mechanism and since all four rotors are identical one such mechanism only is shown in FIG. 2. Each rotor is mounted on a shaft 11 which is rotatably mounted on the frame or fuselage 10. The end of the shaft carries a head 12 on which the blades 13 are mounted for pitch change. The blade mounting may take various forms that particularly shown being spaced bunches of flexible metal straps or strips 14 secured to the head and to each of the blades. This structure mounts the blades for blade pitch change. The cross hatched straps mount the near blade on the head.

Pitch change means of various constructions may be used that particularly shown including a collar 18 slidably mounted on the rotor shaft and rotatable therewith. The collar carries a connecting blade link 19 for each blade which is connected with a blade arm 20 secured at the leading edge of the blade. The collar carries a non-rotatable ring 21 through a bearing 22 so that upward and downward movement of the ring 21 moves the collar therewith through the bearing. Connected as shown, an upward motion of the ring and collar results in a blade pitch increase.

Upward movement of ring 21 may be secured by pulling on cable 26 in the direction of the arrow. This pivots the transfer lever 27 and arm 30 on its pivot 28 in a clockwise direction which raises the assembly of 21, 22, 18 and 19 through the connecting link 29. This link is connected with the transfer arm 30 by a pivot 31 and with the ring 21 by a pivot 32. A blade pitch reduction is obtained by pulling cable 33 to the right. The pivot 28 is mounted on an adjacent part of the airframe.

The control system is shown in FIG. 4 and makes use of a control stick, foot pedals, and collective pitch lever which are the usual helicopter manual control means. The output of the control system appears as rotation of the pulleys 36, 37, 38 and 39 which actuates cables for pitch control of the blades of the rotors A, B, C and D. The cables 26 and 33 control the blades of rotor A. Cables 40 and 41 on pulley 37 control the pitch of the blades of rotor B. Cables 42 and 43 on pulley 38 control the pitch of the blades of rotor C and cables 44 and 45 on pulley 39 control the pitch of the blades of rotor D. Depending on its direction of rotation, each pulley increases or decreases the pitch of the blades of its respective rotor.

For collective control of the pitch of all of the blades in the same direction, the hand lever 48 is pressed up or down. This lever is pivotally mounted on the frame on a pivot 49. Operation of the hand lever 48 swings the arm 50 and through a connecting or input link 51 moves the entire control mechanism in one direction shown as a lateral direction with respect to the pilot. A simple way to achieve this movement is to mount the control mechanism on a main lever means 53 which is pivotally mounted on a frame pivot 54 which pivot is carried by the airframe 10. A connection is made between the connecting link 51 and the main lever means such as through connecting plates 52 secured to the main lever means.

A secondary lever means or swingletree 57 is pivotally mounted on the main lever means on a secondary pivot 58 carried by the main lever means and spaced from the latter's frame pivot means 54. The secondary lever means includes a first arm 59 which is on one side of its pivot 58 and extends away from the frame pivot 54 and a second arm 60 which extends on the opposite side of its secondary pivot means from the first arm and also extends towards the frame pivot means.

The first arm 59 carries a tertiary pivot means 63 on which is mounted a tertiary lever means 64 having a first tertiary arm 65 extending away from secondary pivot means and from the frame pivot 54 which arm is connected by an output link 66 to a lever 67 attached to a sleeve 68 on which the pulley 36 for rotor A is mounted. This tertiary lever means has a second tertiary arm 71 extending towards secondary pivot means 58 and towards the frame pivot means 54 which is connected by an output link 72 to an arm 73 secured to a sleeve 74 to which the pulley 37 is secured. The sleeve 68 is mounted on the sleeve 74 so that the two sleeves and their pulleys are rotatable on a shaft or axle 75 carried by the frame 10.

The second arm 60 of the secondary lever means carries a tertiary pivot means 78 spaced equidistant from the secondary pivot means 58 and on which is mounted another tertiary lever means 79 having a first arm 80 extending in a direction towards the secondary pivot means or away from the frame pivot means or axis 54. This first arm is connected by an output link 81 to a lever 82 carried on a sleeve 83 on which the pulley 39 is mounted for rotor D. The tertiary lever means 79 also has a second tertiary arm 86 extending away from the secondary pivot means 58 or towards the frame pivot means 54 which arm is connected through an output or connecting link 87 to an arm 88 which is attached to a sleeve 89 on which the pulley 38 is mounted. The sleeves 83 and 89 are suitably mounted for rotation, and in the structure illustrated, the sleeve 83 is mounted on the sleeve 89 and the latter is mounted for rotation on a shaft or axle 90 which is supported by the frame 10.

For collective pitch control the pilot moves the lever 48 upwardly or downwardly. For increasing the pitch of all of the blades lever 48 is pulled upwardly which moves link 51 to the left and pivots the main lever means in a clockwise direction on its pivot 54. This moves the secondary lever means 57 and the tertiary lever means 64 and 79 equal amounts in the same direction or clockwise with respect to pivot 54 since the loads on each of the output or connecting links 66, 72, 81 and 87 are all equal. Each of these connecting links move in the direction of the arrow which is the pitch increase direction and rotates its respective pulleys 36, 37, 38 and 39 for an equal increase in pitch of all the blades of all of the rotors. A spring 93 may be attached to any part of the main lever means or its operating linkage to assist the pilot in increasing the pitch of the blades and thereby removing some of this load from the hand lever. There is always included as a part of this operating means or mechanism, brake or ratchet means for retaining the hand lever 48 in adjusted position.

A second operating means or mechanism is provided for adjusting the pitch of the blades of the rotors so that the forward pair of rotors have their pitch decreased or increased and the rear pair of rotors have the pitch of their blades increased or decreased. This operating means will produce forward flight and hence may be operated from a usual pilot's control stick 96 which is mounted for fore and aft movement on a pivot 97 mounted on the frame 10. A third operating means controls roll of the craft which uses laterall movement of the control stick so that it is also mounted for lateral movement on a pivot 98 carried by the pivot means 97 and spaced from its axis. The lower end of the control stick 96 is on the axis of pivot 97 so that it moves laterally independently of or unaffected by any fore and aft movement of the control stick and fore and aft movement of the stick does not affect the lateral stick control. The stick may be moved in both directions to effect both controls.

Upon fore and aft movement of the control stick, an arm 101 moves therewith and moves an input or connecting link 102 therewith. This link is connected with a lever 103 which is pivotally mounted and may conveniently be mounted on the pivot 54. The other end of the lever 103 is connected through a link 104 to an arm 105 which is attached to the secondary lever means 57. Fore and aft movement of the control stick, therefore, turns the secondary lever means about its axis 58 and swings or turns the tertiary lever means therewith so that they move in opposite directions.

If the pilot wishes to fly forward he pushes the control stick 96 forward which pulls input link 102 to the right and pushes link 104 to the left to swing the secondary lever means in a counterclockwise direction about its pivot 58 as viewed from above. The tertiary lever means 64 and 79 move therewith or in opposite directions to shift the links 66 and 72 in a direction opposite from the arrows which direction is a pitch decrease direction for both rotors A and B. This pivotal movement of the secondary lever means 57 pulls the tertiary lever means 79 and its connecting links 81 and 87 in the direction of the arrows for pitch increase so that the blades of the rear rotors C and D have their pitch increased. This maneuver pitches the nose of the aircraft down and secures forward flight. The reverse maneuver would be a nose up maneuver and if carried far enough and permitted by range of movement of the stick would secure rearward flight.

Movement of the control stick laterally pivots the two tertiary lever means 64 and 79 in opposite directions on their respective pivots through a third operating means or mechanism which includes an input or connecting link 108 which is connected with the end of the control stick 96 which movement moves a tetrad lever means 109 as a whole in a direction towards and away from the tertiary lever means. This movement may be accomplished in any suitable manner, a simple way is particularly illustrated which includes a lever 110 connected with the link 108 and pivotally mounted on the frame on a pivot 111. This lever has an arm 112 which carries the tetrad lever means 109 and the latter is pivotally mounted on one arm 112. The tetrad lever means includes an arm 113 connected through a link 114 with an arm 115 attached to or carried by the tertiary lever means 79 for the rear rotors C and D. The tetrad lever means also includes an arm 116 which is connected through a link 117 with an arm 118 attached to or carried by the tertiary lever means 64 for the forward rotors.

If the control stick 96 is moved to the left for a left roll, the lever 110 is pivoted in a counterclockwise direction which moves the tetrad lever means 109 towards the tertiary lever means. This means that arms 113 and 116 and their respective links 114 and 117 move to the left so that the former turns the tertiary lever means 79 for the rear rotors in a counterclockwise direction and this moves the connecting link 87 in the direction of the arrow and the link 81 in the opposite direction of the arrow. As a consequence the pitch of the blades of rotor C is increased and the pitch of the blades of rotor D is decreased. This same movement of the control stick rotates the tertiary lever means 64 in a clockwise direction which in turn moves the connecting link 66 in the direction of the arrow and the link 72 in the opposite direction so that the blades of rotor A have their pitch increased and the blades of rotor B have their pitch decreased to produce a left roll of the aircraft. A light roll is secured by laterally moving the stick to the right of center which pulls the tetrad lever means away from the tertiary lever means and rotates these in opposite directions from that of a left roll to increase the pitch of the blades of rotors B and D and decrease the pitch of the blades of rotors A and C.

It will be noted that the direction of movement of the tetrad lever means as a whole is at right angles to the direction of movement of the control mechanism induced by pivoting of the main lever means 53. As shown the latter movement is in a lateral direction with respect to longitudinal axis y and the former is a longitudinal movement. These movements may be reversed if desired by orienting the entire mechanism through 90°. Also the connecting links 104, 114 and 117 are long enough so that lateral movement does not result in any pivoting of the secondary lever means or the tertiary lever means. A convenient location for the pivot means for tetrad lever means 109 provided by arm 112 is at or about at the axis of the frame pivot means 54.

A fourth operating means is provided to pivot the two tertiary lever means in the same direction. This maneuver is for the purpose of making a right or left yaw or turn. The fourth operating means is shown as including a pair of foot pedals 122 (one only being shown) pivotally mounted on the frame on a pivot 123 which foot pedal carries an arm 124 connected with a link 125 which is in turn connected with one arm 126 of a lever rotatively mounted on a pivot 127. The arm 128 is connected with the connecting link 125 for the right pedal (not shown). The right foot pedal duplicates the construction described and is operated by the right foot of the pilot to raise the arm 128 and pivot the same and lever 129 in a clockwise direction. The left pedal raises the arm 126 and rotates it and lever 129 in a counterclockwise direction. Pivotal movement of the arms 126, 128 swings the lever 129 and operates an input or connecting link 130 which is connected with an arm 131 attached to the tetrad lever means 113, 116 and pivots this tetrad lever means in clockwise or counterclockwise direction to pivot the tertiary lever means in the same direction.

For a left yaw or turn the pilot presses the left pedal 122 which lifts the arm 126 and turns the lever 129 in a counterclockwise direction to move the link 130 and arm 131 counterclockwise. This rotates the tetrad lever means 113, 116 in a counterclockwise direction so that the tertiary lever means 64 is turned in a counterclockwise direction. Counterclockwise operation of the tertiary lever means 64 moves the link 72 in the direction of the arrow for pitch increase of the blades of rotor B, and moves the link 66 in a direction opposite to the arrow to give a pitch decrease to the blades of the rotor A. Arm 113 of the tetrad lever means moves the link 114 in the direction opposite to the arrow and, therefore, turns the tertiary lever means 79 in a counterclockwise direction or the same direction as the tertiary lever means 64. This rotation of the lever means 79 moves the connecting link 87 in the direction of the arrow or pitch increase for the blades of rotor C and moves the connecting link 81 in a direction opposite to the arrow to produce a pitch decrease in the blades or rotor D. With diagonal rotors B and C with increased pitch and rotors A and D with decreased pitch, this differential operation of pitch of the rotors produces a left yaw or turn. Operation of the right foot pedal reverses all of the movements described and produces a right yaw or turn.

The main supporting means may be a lever means and is shown as a simple pivotal lever means, however, it may be of more complex pivotal lever structure as a parallel linkage. Also the second operating means and the fourth operating means constitute operating means for rotating the tertiary levers in the same direction and in opposite directions. The control stick in a broader sense is a part of a separate operating means for fore and aft movement as well as a part of a separate operating means for lateral movement. The control stick as shown constitutes an operating means for turning the secondary lever means and for turning the tertiary lever means in opposite directions.

A link 132 is connected to the arms 126, 128 and operated from a lever or hand wheel to insert sufficient fixed differential pitch into the blades of the rotors in order to trim the aircraft.

FIG. 5 illustrates a modified form of the control system for controlling plural power thrust units such as four rotors of a multi-rotor helicopter. In this system a pair of tertiary lever means are provided. One tertiary lever means 135 is rotatably mounted at its center on a tertiary pivot means 136 so that it has arms extending on opposite sides of its pivot means. A second tertiary lever means 149 is pivoted at its midpoint on a tertiary pivot means 150 so that it has a pair of tertiary arms on opposite sides of its pivot means.

Secondary lever means is provided to mount both tertiary lever means for moving the latter in the same direction and in opposite directions. The means particularly shown is a secondary lever means arm 139 carrying the tertiary pivot means 136 which lever is pivotally mounted on a secondary pivot means 140 which is carried by the frame. The arm may be one arm of a bell crank lever with an arm 141 which is connected by a link 142 with an arm 143 of a secondary operating lever 144. This lever is pivotally mounted on a secondary operating lever pivot 145. The secondary lever means also includes an arm 151 pivotally mounted on the secondary pivot means 140 and carrying the other tertiary lever means 149. This arm may form a part of a bell crank lever having an arm 152 connected by a link 153 to another arm 154 of the secondary operating lever 144. The arms of the secondary operating lever extend in opposite directions from its pivot 145. The arms 139 and 151 of the bell crank levers are the arms of a secondary lever means and illustrate another manner of securing bodily movement of both of the tertiary lever means in a direction at right angles to the arms. Movement of the arms 139, 151 and their tertiary lever means in opposite directions secure pitch increase and decrease of all of the blades of the rotors. Movement or rotation of arms 139, 151 and hence of both tertiary lever means in the same direction secures inverse pitch control between the forward pair of rotors and the rear pair of rotors as will appear. The arrows indicate the direction of movement for pitch increase for each rotor.

For collective pitch control of the pitch of the blades of all rotors uniformly, the secondary operating lever 144 is moved bodily. With arms 141 and 152 extending laterally as shown the movement is in a longitudinal direction with respect to the aircraft. A convenient construction for this movement includes a main supporting means 157, which may be a lever pivotally mounted on a frame pivot means 158, and which carries the secondary operating lever pivot 145 at a point spaced from the frame pivot means 158. The main supporting or lever means is connected through an input or connecting link 51 with the collective pitch control lever 48. The hand lever 48 and its connecting link 51 with the arm of lever 157 comprises a first operating means.

Lifting or raising of the collective pitch control lever or a first operating means, pivots the main lever means 157 counterclockwise which moves the secondary operating lever 144 forwardly or to the left and each of the links 142, 153 forwardly. The secondary lever means arms 139 and 151 pivot in opposite directions to move their respective tertiary lever means laterally in opposite directions which is in the direction of the arrows and hence increases the pitch of the blades of all of the rotors. This maneuver of collectively increasing or decreasing the blades of all rotors an equal amount or uniformly results in rising, hovering or descending movement of the aircraft. The main supporting means in lever form provides a convenient way for bodily moving the secondary operating lever means longitudinally of the aircraft to secure collective pitch control of the blades.

In order to secure roll of the machine or craft, the secondary operating lever 144 is turned on its pivot 145 and a third operating means is provided to secure this result. The secondary operating lever means, therefore, carries an arm 161 to which is connected a link 162. This link is connected with an arm of a bell crank lever 163 which is pivotally mounted on a fixed pivot such as the frame pivot 158. An arm 164 of this bell crank is connected through a link 160 to a bell crank 165 pivotally mounted on pivot 166. This bell crank is connected to the input link 108 of the control stick 96 to be moved by lateral movement thereof to the right or to the left. Movement of the stick in a lateral direction pivots the bell crank lever 163 and through the link 162 rotates the secondary operating lever 144 about its pivot 145. The stick 96 in its lateral movement and connecting linkage with input link 160 constitutes a third operating means.

Clockwise rotation of the secondary operating lever, pivots the arm 139 of the secondary lever means in a clockwise direction and moves the tertiary lever means 135 clockwise or in a direction oppositely from the arrows and, therefore, in a pitch decreasing direction for the blades on both the right forward rotor A and the right rear rotor C. Clockwise rotation of the secondary operating lever 144 also turns the arm 151 of the secondary lever means in a clockwise direction to move the tertiary lever means 149 in the direction of the arrows which is left with respect to the aircraft, and, therefore, increases the pitch of the left front rotor B and the left rear rotor D. Increasing the pitch on the blades of the pair of rotors on the right side and decreasing the pitch of the blades of the two rotors on the right side produces a right roll. For a left roll the control stick is moved laterally to the left which pivots the secondary operating lever 144 in a counterclockwise direction and produces movements of the tertiary lever means which is the reverse of that described.

Operating means is provided to rotate the tertiary lever means 135, 149 in the same direction and in opposite directions. A second operating means for control of pitch of the blades is provided for rotating the two tertiary lever means on their tertiary pivot means in opposite directions for decreasing or increasing the pitch of the blades of the forward pair of rotors A and B and at the same time increasing or decreasing the pitch of the blades of the rear pair of rotors C and D. This operating means includes the control stick 96 which is connected through the lever 101 and link 102 to a lever 183, 184 which is pivotally mounted on the frame such as on the pivot 158. The arm 184 connects lever 183 with and bodily moves a tetrad pivot means 170 for a tetrad lever means 169 which is pivotally mounted on the tetrad pivot means 170. One arm of the tetrad lever means is connected by link 171 to a transfer lever 172 conveniently mounted on the secondary pivot means 140 and an arm 173 of this lever is connected by a link 174 with the tertiary lever means 149. The other arm of the tetrad lever means 169 is connected by a link 177 to a transfer lever 178 conveniently mounted on pivot 140 and having an arm 179 which is connected by a link 180 to the tertiary lever means 135.

If now the control stick 96 is pushed forward for forward pitch, the input link 102 moves forwardly or to the left in the figure and lever 183, 184 is rotated in a clockwise direction which bodily moves the tetrad lever means 169 bodily in a direction at right angles or lateral to the direction of its arms or downwardly as viewed in the figure. Transfer lever 172 rotates in a clockwise direction and transfer lever 178 rotates counterclockwise. The link 174 is pulled forwardly or to the left and rotates the tertiary lever means 149 in a clockwise direction so that the output or connecting link 81 moves in the direction of the arrow to increase the pitch of the blades of the left rear rotor D and output link 72 moves oppositely from the arrow which decreases the pitch of the blades of the left front rotor B. Counterclockwise rotation of lever 178 in turn rotates the tertiary lever means 135 in a counterclockwise direction whereby the output or connecting link 87 is moved in the direction of its arrow to increase the pitch of the blades of the right rear rotor C and connecting link 66 moves oppositely from the arrow to decrease the pitch of the blades of the right front rotor A.

Means are provided for yaw maneuvers which is secured by rotating the tetrad lever means 169 by a fourth operating means such as the foot pedal structure of FIG. 4. This means may take several forms and a convenient form includes a lever 167 pivoted on a pivot such as pivot 158 and connected through a link 168 with the tetrad lever means 169. Operation of the lever 167 by the input or connecting link 130 will rotate the tetrad lever means 169 and in so doing rotates the transfer levers 178 and 172 in the same direction which in turn rotates the tertiary lever means 135 and 149 in the same direction. For example if the tetrad lever means is rotated clockwise the tertiary lever means 135 and 149 are rotated in a clockwise direction. With rotation of 135 clockwise, the blades of the right rear rotor C have their pitch decreased and the blades of the right front rotor A are increased. Clockwise rotation of the tertiary lever means 149 increases the pitch of the blades of the left rear rotor D and decreases a pitch of the left front rotor B. Pressing of a right pedal therefore moves input link 130 to rotate lever 167 clockwise which rotates tetrad lever means 167 clockwise for a right yaw maneuver.

A comparison of the control system of FIG. 4 and that of FIG. 5 teaches that it is immaterial which of the connecting links 66, 72, 81 and 87 is connected with which of the four rotors or its direction for blade pitch increase. By movement of the tertiary control means to give the four maneuvers and tracing the connections back to the operating links 51, 102, 130 and 108 of each of the operating means, it can be determined what connection the respective operating or input link must make with the helicopter operating means of stick, pedals and collective pitch lever.

To illustrate this flexibility or versatility of arrangement further, suppose for example that the control system of FIG. 5 is arranged or used to duplicate or operate the output set up of FIG. 4. To retain the same forward direction the control system is rearward of the pilot and forward of the output links. Then output link 66 is connected with right front (RF) rotor A, output link 87 is connected with left front rotor B, output link 72 is connected with left rear (LR) rotor D and output link 81 is connected with right rear (RR) rotor C. In order to further show the versatility or flexibility, assume also that the connecting links 72 and 81 and their pulley arms and pulleys are connected with the pitch control mechanism of the blades such that pitch increase is in a direction oppositely from that of the arrows shown for these connecting links in FIG. 5. In other words pitch increase is in the same direction as that of the arrows of links 66 and 87. This duplicates the connections with the pulleys or the pulley arms and hence rotors as shown in FIG. 4.

With the output set up, arrangement or conection as described and tracing from the tertiary lever means, the movements necessary for collective pitch, craft pitch, roll and yaw, then the input or operating link 160 becomes a collective pitch input link instead of roll input as shown in FIG. 5. The input link 51 which is shown in FIG. 5 as a pitch input link would remain a pitch input link for decreasing and increasing the pitch of the blades of the forward pair of rotors with respect to that of the rear pair of rotors or a craft pitch control for forward flight. Again tracing back from the tertiary lever means, the operating or input link 102 becomes a roll input link whereas input link 102 of FIG. 5 is a pitch input link. Finally input link 130 remains as a yaw control input. Other arrangements of the control system of FIG. 5 may be set up and traced back from the tertiary lever means in order to determine which input link serves to give its one of the four maneuvers.

Similarly the control system of FIG. 4 may be connected with the output set up or connection pattern of FIG. 5 in which 66, 72, 81 and 87 of FIG. 4 become 66, 87, 72 and 81 respectively of FIG. 5 and links 81 and 87 of FIG. 4 having arrows for increased pitch pointing in the opposite direction. This duplicates the ouput set up of FIG. 5. Input link 102 becomes the collective pitch control for connection with handle 48. Input link 108 becomes the pitch control for connection with the arm 101 of the control stick 96. Input link 51 would control roll and hence would be suitably connected with the control stick for operation by lateral movement thereof. Input link 130 would continue to control yaw hence would be connected with the foot levers as shown in FIG. 4. The linkage connection between the operating means and the respective input link would be easily devised. Using the method of varying the connections for the output links as pointed out above and tracing back the movements of the tertiary lever means necessary to produce the four desired maneuvers, the input links for securing each maneuver will be determined for any particular set up or connection pattern and any direciton of movement of the output links for pitch increase of the blades of its particular rotor.

The control systems of FIGS. 4 and 5 differ essentially in the construction of the secondary lever means in which the two arms of FIG. 4 are integral and opposite so that rotation results in movement of the tertiary lever means in opposite directions. Also the secondary pivot means is movably mounted so that movement thereof secures movement of the tertiary lever means in the same direction. The control system of FIG. 5 uses a secondary lever means of two separate arms mounted on a fixed secondary pivot means. This enables both arms 139 and 151 of the secondary lever means to extend in the same direction from the secondary pivot means. Rotation of the arms of the secondary lever means in the same direction results in the tertiary lever means moving in the same direction and rotation of the arms of the secondary lever means in opposite directions results in the tertiary lever means moving in opposite directions.

The tertiary operating levers for rotating the tertiary lever means in the same and in opposite directions are shown as connected to opposite sides of these lever means so that rotation or turning of the operating lever rotates the tertiary lever means in the same direction and lateral movement of the tertiary operating lever rotates the tertiary lever means in opposite directions. If, however, the operating lever is connected with the tertiary lever means on the same side then the reverse operation of the tertiary lever means occurs.

This invention is presented to fill a need for improvements in a Control System for Four Power Units and the Combination. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A control system for a machine having a plurality of thrust elements and thrust control means for each element and a frame comprising a pair of tertiary lever means, tertiary pivot means mounting each tertiary lever means, each tertiary lever means having solely one pair of arms fixed together and of equal length and extending on opposite sides of its respective tertiary pivot means, an output connecting means connected with each arm and adapted to be connected with a thrust control means, mounting means mounting the tertiary pivot means for moving the latter in the same direction and in opposite directions including secondary lever means and secondary pivot means pivotally mounting the secondary lever means, operating means connected with the secondary lever means to move the tertiary pivot means in opposite directions, operating means connected with the mounting means to move the tertiary pivot means in the same direction, and operating means connected with the tertiary lever means to rotate the same in the same direction and in opposite directions.

2. A control system for a machine having a plurality of thrust elements and thrust control means for each element and a frame comprising a pair of tertiary lever means, tertiary pivot means mounting each tertiary lever means, each tertiary lever means having solely one pair of arms fixed together and of equal length and extending on opposite sides of its respective tertiary pivot means, an output connecting means connected with each arm and adapted to be connected with a thrust control means, tertiary operating means connected with the tertiary lever means to rotate the latter in the same and in opposite directions, mounting means mounting the tertiary pivot means for movement in the same direction and in opposite directions, operating means connected with the mounting means for the tertiary pivot means to move the latter in opposite directions, and operating means connected with the mounting means for the tertiary pivot means to move the latter in the same direction.

3. A control system as in claim 2 in which the operating means for rotating the tertiary lever means includes a tetrad lever means having a pair of arms each connected with one of the tertiary lever means, tetrad pivot means rotatively mounting the tetrad lever means between its ends, means mounting the tetrad pivot means for movement in a direction at right angles to its arms, an input link connected with the tetrad lever means to turn the same, and an input link connected with the mounting means for the tetrad pivot means to move the same.

4. A control system as in claim 3 in which the mounting means mounting the tetrad pivot means is a tetrad operating lever, and a pivot for the tetrad operating lever spaced from the tetrad pivot means.

5. A control system as in claim 1 in which the operating means for the secondary lever means includes an input link connected with the secondary lever means to rotate the same on its secondary pivot means.

6. A control system as in claim 2 in which two of the operating means includes a control stick, means mounting the control stick for fore and aft movement and for lateral movement, and one operating means being connected with the control stick for operation by fore and aft movement and the other end being connected with the control stick for operation by lateral movement of the control stick.

7. A control system for a four element thrust machine having thrust control means for each element and a frame comprising a main supporting means, means mounting the main supporting means for movement on the frame, a first operating means connected with the main supporting means to move the same, a secondary lever means, secondary pivot means pivotally mounting the secondary lever means on the main supporting means, the secondary lever means having a first arm and a second arm fixed together and extending away from each other on opposite sides of the secondary pivot means and laterally with respect to the movement of the main supporting means, a pair of tertiary lever means, tertiary pivot means mounting each tertiary lever means on the secondary lever means, one tertiary pivot means being located on the first arm and the other being located on the second arm with each being equidistant from the secondary pivot means, each tertiary lever means having a first tertiary arm extending in the same direction with respect to its tertiary pivot means and a second tertiary arm extending in the same direction with respect to its tertiary pivot means and oppositely from the first tertiary arm, the first arm and the second arm of each tertiary lever means being fixed together, connecting means from each tertiary arm and adapted to be connected to its respective thrust control element, a second operating means connected with the secondary lever means to pivot the same about its secondary pivot means, and operating means connected with each tertiary lever means to pivot the same about its respective pivot means in the same direction and in opposite directions.

8. A control system as in claim 7 in which the main support means includes a main lever means, frame pivot means mounting the main lever means on the frame, and the secondary pivot means being spaced from the frame pivot means.

9. A control system as in claim 7 in which the operating means for the tertiary lever means includes a tetrad lever means connected with each tertiary lever means, tetrad pivot means pivotally mounting the tetrad lever means a distance far enough removed therefrom to be inaffected by movement of the main supporting means, means mounting the tetrad pivot means for movement towards and away from the tertiary lever means, a third operating means connected with the tetrad lever means to pivot the same, and a fourth operating means connected with the mounting means for the tetrad pivot means to move the same in a direction towards and away from the tertiary lever means.

10. A control system as in claim 9 in which the second operating means and the fourth operating means includes a control stick and means mounting the control stick for fore and aft movement and for lateral movement.

11. A control system as in claim 9 in which the third operating means is foot pedal means adapted to be mounted on the frame.

12. A control system as in claim 11 in which the second operating means and the fourth operating means includes a control stick, means mounting the control stick for fore and aft movement and for lateral movement, and the second operating means being controlled by fore and aft movement of the control stick and the tertiary operating means being controlled by lateral movement of the control stick.

13. A control system as in claim 9 in which the fourth operating means includes a pivoted lever, and operating means connected with the lever to pivot the same.

14. A control system for a machine having four thrust elements and thrust control means for each element and a frame comprising a main supporting means, means mounting the main supporting means for movement on the frame, a first operating means connected with the main supporting means to move the same, a secondary lever means, secondary pivot means pivotally mounting the secondary lever means on the main supporting means, the secondary lever means having a first arm and a second arm fixed together and extending away from each other on opposite sides of the secondary pivot means and laterally with respect to the movement of the main supporting means, a pair of tertiary lever means, tertiary pivot means mounting each tertiary lever means on the secondary lever means, one tertiary pivot means being located on the first arm and the other being located on the second arm with each being equidistant from the secondary pivot means, each tertiary lever means having a first tertiary arm extending in the same direction with respect to its tertiary pivot means and a second tertiary arm extending in the same direction with respect to its tertiary pivot means and oppositely from the first tertiary arm, each first and second tertiary arm being fixed together, connecting means from each tertiary arm and adapted to be connected to its respective thrust control means, operating means connected with the secondary lever means to pivot the same about its secondary pivot means, operating means connected with each tertiary lever means to pivot the same about its respective pivot means in opposite directions, and operating means connected with each tertiary lever means to pivot the same about its respective pivot means in the same direction.

15. A control system for a machine having a plurality of thrust elements and thrust control means for each element and a frame comprising secondary lever means, secondary pivot means pivotally mounting the secondary lever means on the frame, the secondary lever means having separate first and second arms in overlying relation, a pair of tertiary lever means, tertiary pivot means for each tertiary lever means mounting a tertiary lever means on the secondary lever means, one tertiary pivot means being located on the first arm and the other being located on the second arm with each being equidistant from the secondary pivot means, each tertiary lever means having a pair of arms fixed together and extending in opposite directions with respect to its tertiary pivot means, an output connecting means from each tertiary arm and adapted to be connected to its respective thrust control means, operating means connected with each arm of the secondary lever means to pivot the same about the secondary pivot means in the same and in opposite directions, and operating means connected with each tertiary lever means to pivot the same about their respective pivot means in the same direction and in opposite directions.

16. A control system as in claim 15 in which the operating means for rotating the tertiary lever means includes a tetrad lever means having a pair of arms each connected with one of the tertiary lever means, tetrad pivot means rotatively mounting the tetrad lever means between its ends, means mounting the tetrad pivot means for movement in a direction at right angles to its arms, an input link connected with the tetrad lever means to turn the same, an input link connected with the mounting means for the tetrad pivot means to move the same.

17. A control system as in claim 16 in which the mounting means mounting each tetrad pivot means is an arm, and a pivot for the arm spaced from the tetrad pivot means.

18. A control system as in claim 16 including a pair of transfer levers mounted on the secondary pivot means and each connected with one of the tertiary lever means, and each arm of the tetrad lever means being connected with one of the transfer levers.

19. A control system as in claim 15 in which the operating means for rotating the tertiary lever means includes a tetrad lever means having a pair of arms each connected with one of the tertiary lever means, tetrad pivot means rotatively mounting the tetrad lever means between its ends, means mounting the tetrad pivot means for movement in a direction at right angles to its arms, an input link connected with the tetrad lever means to turn the same, an input link connected with the mounting means for the tetrad pivot means to move the same, the operating means for moving the tertiary lever means in the same and opposite directions includes a secondary operating lever having arms, a secondary operating lever pivot mounting the secondary operating lever between its ends, a connection from each arm to one of the secondary lever means, an input link connected with the secondary operating lever to turn the same, mounting means mounting the secondary operating lever pivot for movement in a direction laterally to the arms, and an input link connected with the mounting means to move the same.

20. A control system as in claim 15 in which the operating means for rotating the tertiary lever means includes a pair of transfer levers pivotally mounted on the secondary pivot means and connected with a tertiary lever means, a tetrad lever means having a pair of arms each connected with one of the transfer levers, tetrad pivot means rotatively mounting the tetrad lever means between its ends, means mounting the tetrad pivot means for movement in a direction at right angles to its arms, an input link connected with the tetrad lever means to turn the same, an input link connected with the mounting means for the tetrad pivot means to move the same, the operating means for moving the tertiary lever means in the same and opposite directions includes a secondary operating lever having arms, a secondary operating lever pivot mounting the secondary operating lever between its ends, a connection from each arm to one of the secondary lever means, an input link connected with the secondary operating lever to turn the same, mounting means mounting the secondary operating lever pivot for movement in a direction laterally to the arms, and an input link connected with the mounting means to move the same.

21. A control system as in claim 15 in which the operating means for rotating the tertiary lever means includes a pair of transfer levers pivotally mounted on the secondary pivot means and each connected with a tertiary lever means, a tetrad lever means having a pair of arms each connected with one of the transfer levers, tetrad pivot means rotatively mounting the tetrad lever means between its ends, a pivoted lever mounting the tetrad pivot means for movement in a direction at right angles to its arms and having a pivot spaced from the tetrad pivot means, an input link connected with the tetrad lever means to turn the same, an input link connected with the pivoted mounted lever for the tetrad pivot means to move the same, the operating means for moving the tertiary lever means in the same and opposite directions including a secondary operating lever having arms, a secondary operating lever pivot mounting the secondary operating lever between its ends, a connection from each arm to one of the secondary lever means, an input link connected with the secondary operating lever to turn the same, a pivoted mounting lever mounting the secondary operating lever pivot for movement in a direction laterally to the arms and having a pivot spaced from the secondary operating lever pivot, and an input link connected with the mounting lever to move the same.

22. A control system for a machine having a plurality of thrust elements and thrust control means for each element and a frame comprising a pair of tertiary lever means, tertiary pivot means mounting each tertiary lever means, each tertiary lever means having a pair of arms fixed together of equal length and extending on opposite sides of its respective tertiary pivot means, an output connecting means connected with each arm and adapted to be connected with a thrust control means, secondary lever means mounting the tertiary lever means for moving the latter in the same direction and in opposite directions, secondary pivot means pivotally mounting the secondary lever means, operating means connected with the secondary lever means to rotate the same on the secondary pivot means to move the tertiary lever means in opposite directions, operating means connected with the secondary lever means to move the tertiary lever means in the same direction, and operating means connected with the tertiary lever means to rotate the same in the same direction and in opposite directions.

References Cited in the file of this patent

UNITED STATES PATENTS

| 2,318,260 | Sikorsky | May 4, 1943 |
| 2,540,404 | Neale | Feb. 6, 1951 |

FOREIGN PATENTS

| 936,056 | France | Feb. 16, 1948 |

OTHER REFERENCES

"Flight," issue of April 14, 1949, pages 427–429, 431.